United States Patent [19]

Eaton

[11] Patent Number: 4,972,090
[45] Date of Patent: Nov. 20, 1990

[54] METHOD AND APPARATUS FOR MEASURING AND INSPECTING ARTICLES OF MANUFACTURE FOR CONFIGURATION

[76] Inventor: Homer L. Eaton, 111 "C" Sequoia Ave., Carlsbad, Calif. 92008

[21] Appl. No.: 389,357

[22] Filed: Aug. 3, 1989

[51] Int. Cl.$^5$ ............................................. G01N 21/86
[52] U.S. Cl. ...................................... 250/560; 356/376
[58] Field of Search ........................ 356/386, 387, 376; 250/560, 561, 223 B

[56] References Cited

U.S. PATENT DOCUMENTS

| | | | |
|---|---|---|---|
| 3,633,010 | 1/1972 | Svetlichny | 235/151 |
| 3,924,338 | 12/1975 | Kindl | 33/174 |
| 3,944,798 | 3/1976 | Eaton | 235/151 |
| 4,122,525 | 10/1978 | Eaton | 364/560 |
| 4,245,517 | 1/1981 | Barker | 356/386 |
| 4,475,035 | 10/1984 | Eaton | 250/236 |
| 4,593,476 | 6/1986 | Clark | 33/529 |
| 4,604,813 | 8/1986 | Kawanami et al. | 33/529 |
| 4,622,462 | 11/1986 | Eaton | 250/236 |
| 4,623,797 | 11/1986 | Eaton | 250/560 |
| 4,636,635 | 1/1987 | Krönseder | 250/223 B |
| 4,679,331 | 7/1987 | Koontz | 33/551 |
| 4,695,982 | 9/1987 | Preysman | 364/506 |
| 4,721,388 | 1/1988 | Takagi et al. | 356/376 |
| 4,731,934 | 3/1988 | Barnaby et al. | 33/504 |
| 4,764,015 | 8/1988 | Bieringer et al. | 356/372 |
| 4,800,652 | 1/1989 | Ballas et al. | 33/552 |
| 4,807,152 | 2/1989 | Lane et al. | 364/513 |
| 4,849,643 | 7/1989 | Mundy | 356/376 |

Primary Examiner—David C. Nelms
Attorney, Agent, or Firm—Baker, Maxham, Jester & Meador

[57] ABSTRACT

An inspection and measuring apparatus comprises a housing, having a holder for supporting a workpiece for rotation about a first vertical axis and for limited rotation about an orthogonal axis, a light beam supported out from a second vertical axis for positioning for selective interruption by the workpiece upon rotation of the light beam means for detecting the coordinate position of interruption of the beam by the workpiece and comparing same to a reference.

29 Claims, 5 Drawing Sheets

METHOD AND APPARATUS FOR MEASURING AND INSPECTING ARTICLES OF MANUFACTURE FOR CONFIGURATION

BACKGROUND OF THE INVENTION

The present invention relates to methods and apparatus for measuring and inspecting articles of manufacture, and pertains particularly to an improved method and apparatus for noncontact measuring and inspecting of articles of complex configurations.

It is frequently necessary to carefully inspect the configuration of manufactured parts in order to insure proper fit in the assembly process. Many different approaches have been proposed in the past for providing efficient and accurate systems for such measurement and inspection of such articles. While many such devices have been developed and provide many improvements, they are still deficient in many respects.

One area of particular concern for which the present invention has been developed is that of measuring bent tubing, such as fuel, hydraulic and other fluid carrying tubing. In the inspection of such articles, it is necessary to measure in three dimensions the axis of several straight portions in order to define the length of the straight portions, the angle of the bend between adjacent straight portions, and the angle of the plane of one bend with respect to the plane of another bend.

In my prior U.S. Pat. No. 3,944,798, entitled "Method and Apparatus for Measuring Direction", which is incorporated herein by reference, I provide a significantly improved device for measuring such articles of manufacturing. The apparatus disclosed and claimed in my prior patent is directed to a five axis articulated probe, having a working head that may be oriented in three dimensions so as to align itself with a straight portion of the tube. This arrangement requires actual contact of the working head with the article of manufacture, and permits measurement of the vector that is parallel to the tube axis to be made with a single operation. With this apparatus, however, the article being measured must be clamped to a support, and then contacted with the measuring instrument, at least once for each straight portion, in order to obtain the desired information. This operation is time consuming and may be ineffective, particularly for non-conductive or coated articles.

In my more recent U.S. Pat. No. 4,122,525, entitled "Method and Apparatus for Profile Scanning", which is incorporated herein by reference, I disclose a further improvement in inspection apparatus, wherein an object is scanned by moving a scanning beam across the object in a scan pattern, relatively moving the object and the pattern, and generating signals at collectively defined points of intersection of the beam scan pattern with a boundary of the object. The major drawback of this apparatus is that it is complex and has many moving parts.

U.S. Pat. No. 4,778,274, entitled "Noncontact Measuring Device for Cylindrical, Elongated Objects Bent Into Three-Dimensional Shapes", granted Oct. 18, 1988 to Yogo, discloses another approach to the measuring and inspecting of such articles. This apparatus, however, provides a scanning head, which must be tracked by complex mechanisms along the length of the article.

The present invention was devised to provide an apparatus that overcomes the above problems of the prior art.

SUMMARY AND OBJECTS OF THE INVENTION

It is the primary object of the present invention to provide an improved method and apparatus for noncontact inspecting and measuring articles of complex configurations.

In accordance with a primary aspect of the present invention, an apparatus for determining the configuration of an article of manufacture comprises means for supporting an article for rotation about a vertical axis, means for establishing and positioning an energy beam for intersection by said article upon rotation thereof, and means for generating signals responsive to said intersection for establishing the configuration of said article.

BRIEF DESCRIPTION OF THE DRAWING

The above and other objects and advantages of the present invention will become apparent from the following description when read in conjunction with the accompanying drawings wherein.

DETAILED DESCRIPTION OF A PREFERRED EMBODIMENT

Figure 1:
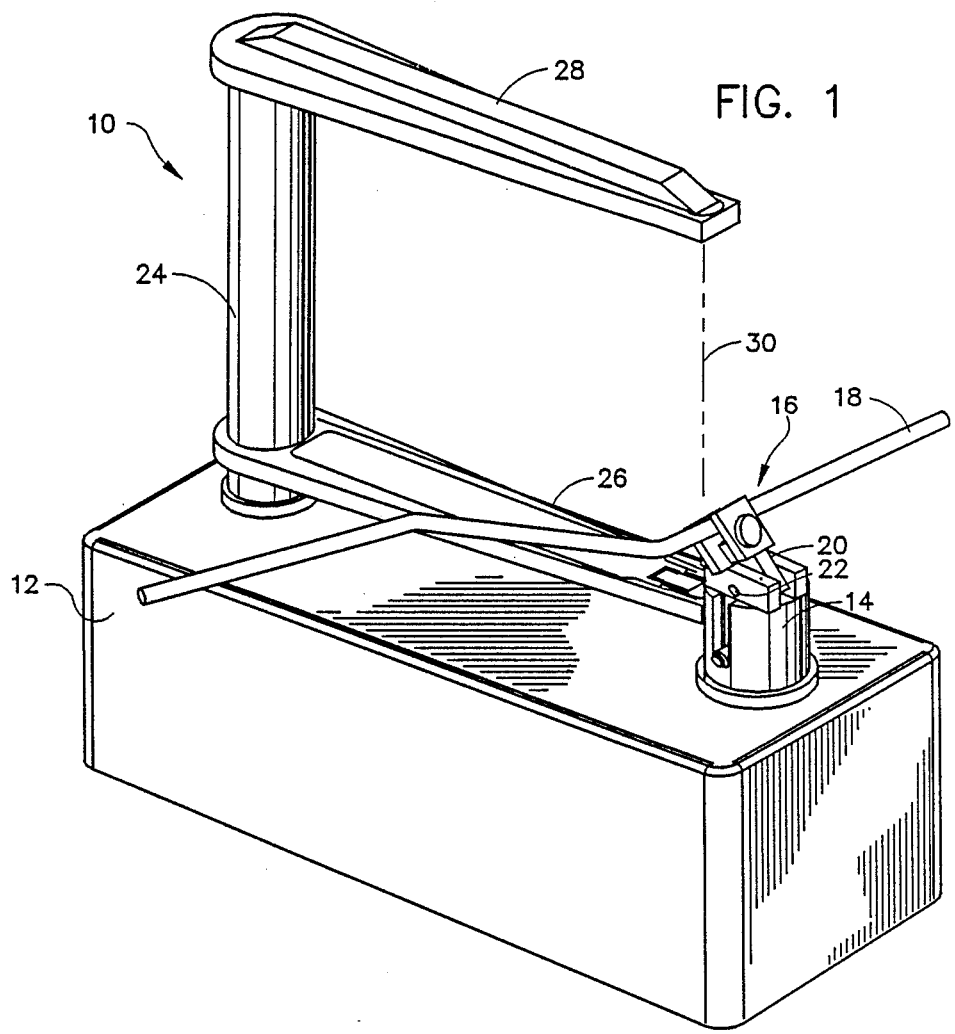
FIG. 1 is a perspective view of a preferred embodiment of the invention.

Referring to the drawing, and particularly to FIG. 1, there is illustrated an inspection and measuring apparatus in accordance with a preferred embodiment of the invention. The apparatus, designated generally by the numeral 10, comprises a generally rectangular box-like housing 12 for containing electronics and drive mechanisms to be described. Means for holding a part or workpiece at one end of the housing comprises a rotatable shaft 14 that extends vertically from the top of the housing, and includes a clamp assembly 16 for gripping and holding a workpiece 18. This enables the part or workpiece to be rotated 180 degrees about a vertical axis, hereinafter referred to as the "A" axis.

The workpiece, in the illustrated embodiment, is in the form of an elongated tube having a plurality of bends therein. The workpiece holder comprises a vertical shaft mounted for rotation about a vertical axis three-hundred sixty degrees in a controlled motion, powered by, for example, an electronically controlled stepper motor.

Figure 2:
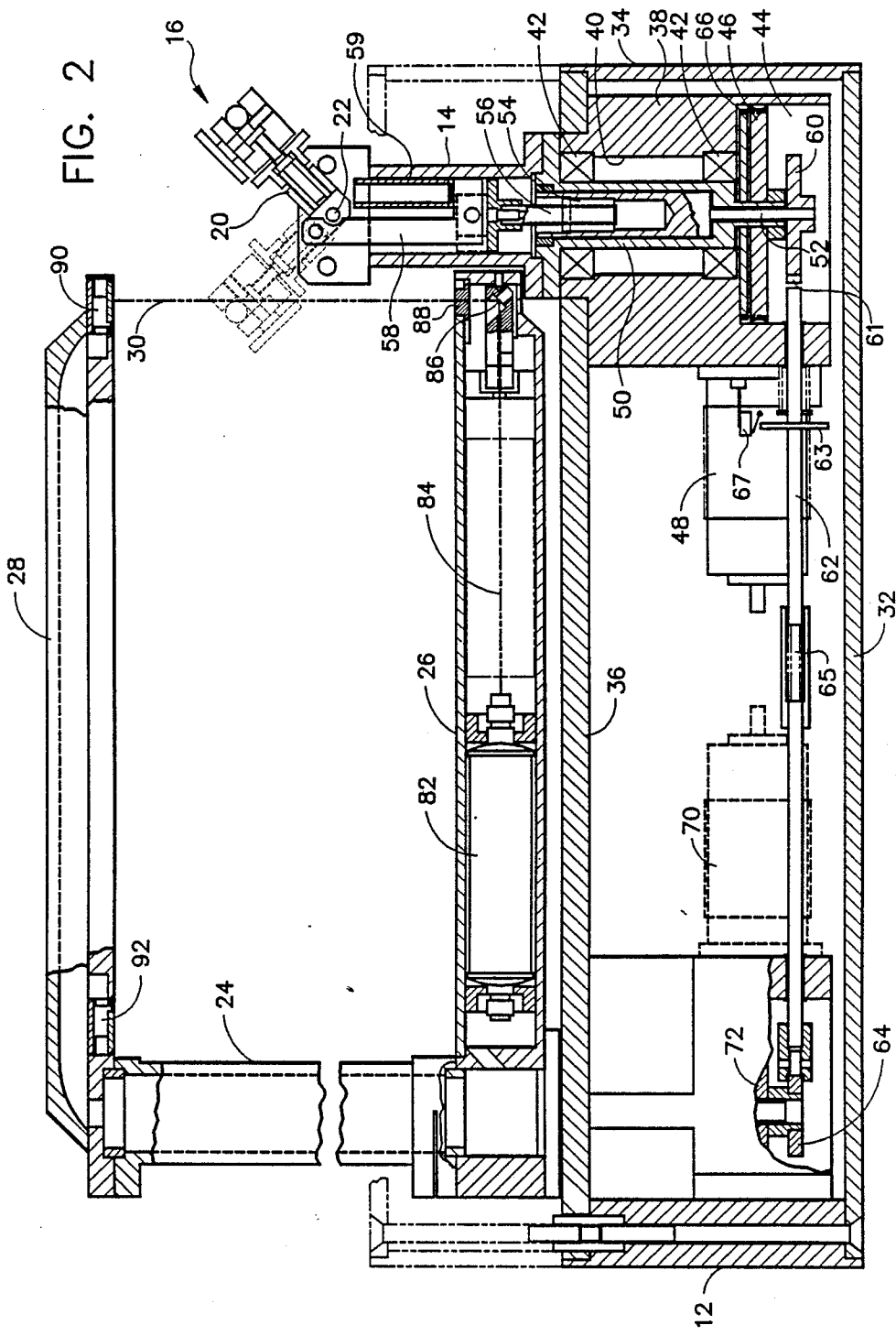
FIG. 2 is a side elevation view in section of the embodiment of FIG. 1.

The clamp 16 is mounted on a pivoting arm 20, which is pivotally mounted on pin 22 at the upper end of shaft 14 for pivotal movement about an axis orthogonal to the vertical axis. This enables the workpiece to be flip flopped from a vertical position to positions at forty-five degrees to each side of the vertical, as seen in FIG. 2. The part or article holder is rotatable three-hundred sixty degrees about the vertical axis to position the part or article 18 in various positions to be intersected by means of a vertical energy beam, preferably in the form of a light beam.

Light beam, support and positioning apparatus comprise a vertical shaft 24, which is journaled in the opposite end of the housing and driven by a controlled stepper motor for rotation about a vertical axis. A pair of outwardly extending vertically spaced support arms 26 and 28 extend outward from the shaft 24, and support means for establishing and for positioning a light or energy beam. The energy beam 30 may be established by any suitable means, such as a laser or a light emitting diode, as will be more fully described. The arms 26 and 28 are movable with the shaft 24 about its axis for positioning the light beam 30 for selective intersection interruption by the workpiece 18.

As will be more fully discussed, the apparatus is controlled by a pre-programmed computer, such as a PC or the like having a video screen for establishing or comparing the configuration of the workpiece 18. The machine is programmed to selectively rotate the workpiece 18 about the vertical axis of shaft 14, and about the orthogonal axis 22 for intersecting the properly positioned beam 30 at selected positions along the length of the workpiece 18 for establishing the configuration and size thereof.

Referring to FIG. 2 of the drawing, the housing 12 comprises a base plate 32 that is removable from the housing to reveal the interior thereof. Upstanding sidewalls 34 provide the sidewalls of the rectangular enclosure with the top plate 36 covering the housing. At the forward end of the housing, a support block or member 38 is formed with a vertical bore 40, in which the control and support shaft assembly of the workpiece holder is rotatably journaled in upper and lower bearings 42. A cavity 44 at the lower end of the member 38 provides spacing for mounting a worm drive gear 46, driven by a motor 48 for driving the support and control shaft assembly of the article holder. The gear 46 drives a lower tubular shaft 50, which is connected at its upper end to the upwardly extending shaft 14, which supports the clamp assembly.

An inner shaft 52 is journaled within the shaft 50, and is frictionally carried thereby. The shaft 52 includes a bore or cavity in which a nut 54 is secured for threadably engaging a vertically moveable threaded shaft 56, which is connected at an upper end to the lower end of an L shaped link member 58 for pivoting the clamp support arm 20 about the orthogonal axis 22. A spring mechanism 59 biases against the lower leg of link 58 for biasing it about its lower pivot pin and the upper end thereof against arm 20 for biasing it toward alternate extreme positions. A brake disc 60 on the lower end of shaft 52 has a slot 61, which is engaged by an elongated brake or locking rod 62 actuated by a cam 64 on the lower end of shaft 24 for locking it against rotation. The rod 62 has a lost motion device in the form of a compression spring 65 that accommodates biasing against disc 60 until slot 61 is engaged. A limit switch 67 is actuated by ring 63 when the rod 62 moves to the right into slot 61.

Figure 3:
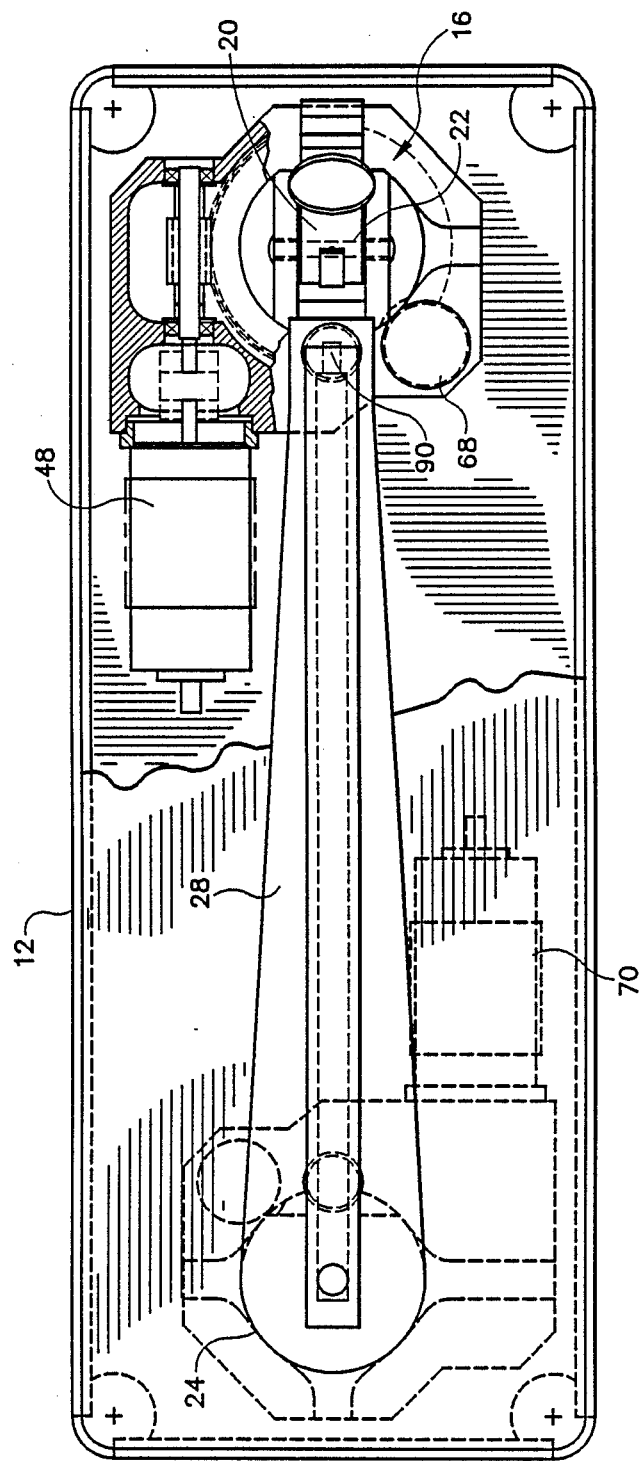
FIG. 3 is a top plan view with portions broken away of the embodiment of FIG. 2.
Figure 4:
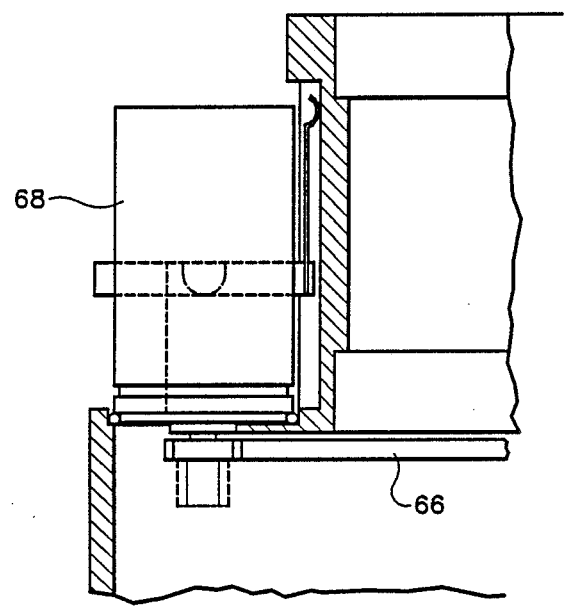
FIG. 4 is a detailed side elevation view in section of a portion of the embodiment of FIG. 1.

A gear 66 on shaft 50 drives an optical shaft encoder 68 (FIG. 3) for indicating the angular position of the work holder, as will be explained. Referring to FIG. 4, the encoder mounting arrangement is illustrated showing the encoder mounted in a pivoting ring and biased by a spring into driving engagement with the drive gear 66. A substantially identical drive arrangement and encoder (partially shown) for the light beam axis is provided for the shaft 24 carrying arms 26 and 28. A drive motor 70 drives a similar drive assembly of a worm gear 72, driving the shaft 24 and encoder for positioning the light beam 30.

Means for generating the light beam 30 can be either a light emitting diode positioned at the outer end of the lower arm, or it can be a laser as illustrated in FIG. 2. As illustrated in FIG. 2, the lower arm 26 is formed as an elongated box-like housing in which is mounted a laser 82, such a blank for example generates a light or laser beam 84, projected onto a mirror 86 and reflected as beam 30, which is directed to and sensed by a light receiving diode 90 on the outer end of the upper arm. The beam is reflected from mirror 86 through an aperture or the like 88 onto the light receiving diode 90 at the outer end of the upper arm 28. The diode 90, as explained in connection with the control circuit, is balanced by means of a similar light receiving diode 92 at the inner end of the arm to measure ambient light. Thus, the sensitivity of the receiving diode 90 is balanced by the ambient light responsive diode 92, as will be further explained.

Figure 5:
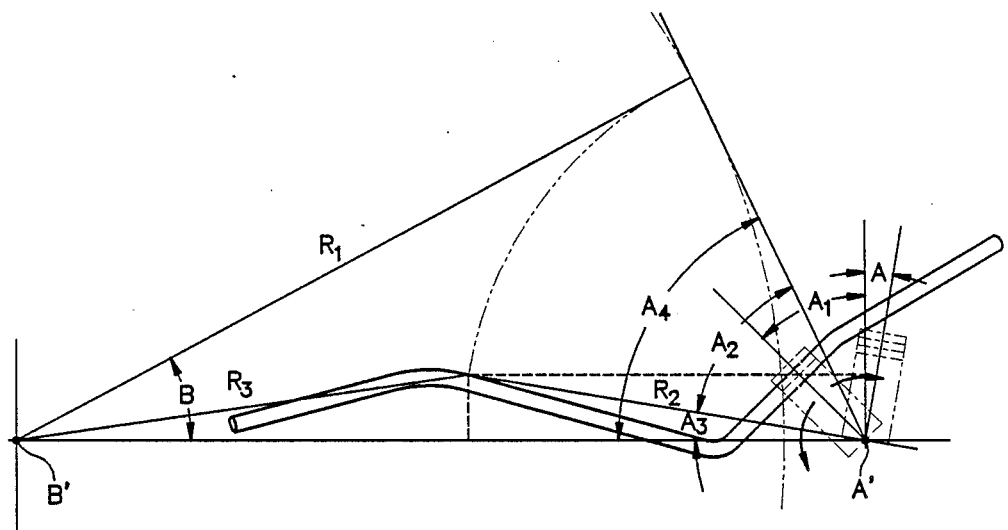
FIG. 5 is a schematic illustration of the axis of movement and plane of movement of an article during inspection.

Referring to FIG. 5, there is illustrated angles of movement for intersection of the workpiece or article 18, and the light beam 30 carried on an outer end of the arms 26 and 28. Thus, an axis A' represents the rotary axis of the shaft 14, and axis B' represents the axis of the shaft 24. Thus, with proper combinations of angular movement of the respective axis, proper positioning and intersection of the light beam can be provided at selective positions along the length of the work member 18.

Figure 6:
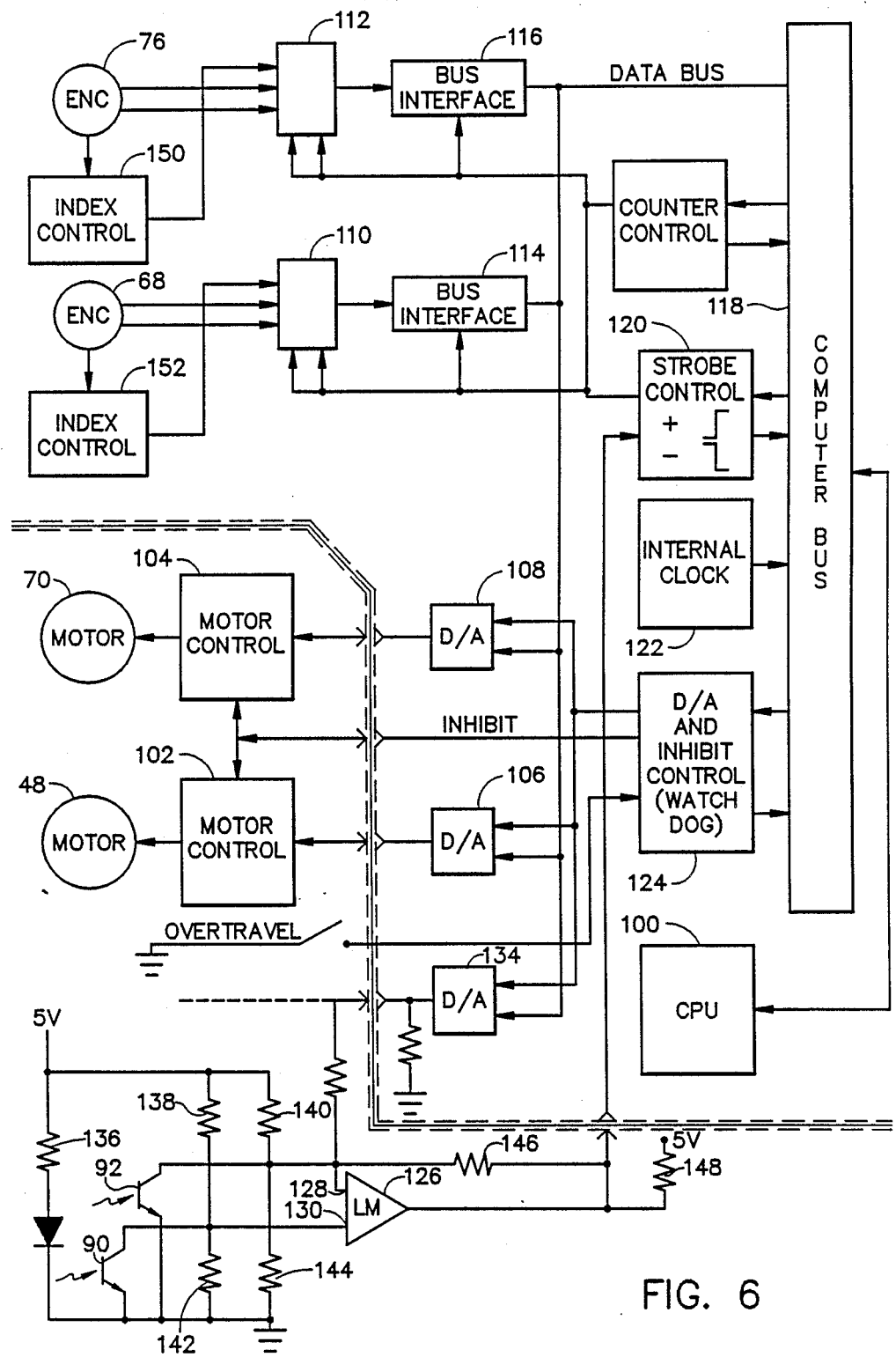
FIG. 6 is a schematic illustration of the control circuit of the embodiment of FIG. 1.

Referring to FIG. 6 of the drawings, there is a schematically illustrated the overall control and operating system of the present invention. The illustrated system includes a computer (CPU) 100 and electronic control means for controlling the two electric motors 48 and 70 to drive the two shafts 14 and 24 of the part holder and the light beam, respectively. These motors are DC motors and each have standard off-the-shelf DC motor controllers 102 and 104. These controllers may be obtained from Advanced Motion Controls in Compton, California. The controllers convert 36 volts raw DC into a pulse with modulated wave form that drives the motors.

The motor 48 functions to rotate shaft 14, which carries the part or workpiece about its axis. The motor 70 is the one which functions to drive the shaft 24 that carries the infrared beam about its axis. Each motor is driven at a programmed speed, the speed actually being regulated by the computer 100, and the amount of speed control is stored in the computer digitally, and is sent to the motor controls 102 and 104 via a pair of digital to analog converters (D/A) 106 and 108. The motor control receives the signal in the form of an analog voltage from the respective D/A converters.

It is important to understand that when one is measuring with a beam and there is a beam event, that is either the beam has gone off or the beam has gone on, one must know exactly the position of the two moving members on the machine. One must know where the beam is and where the tube or workpiece is at exactly the same time, at the time the beam event occurred. This is handled in the present system by two electronic counters 110 and 112. These counters may be obtained from Hewlett Packard, Palo Alto, California, in the form of electronic counter chips called a HCTL 2000. These chips are a suitable device to achieve this kind of event, that is this sort of strobing to know exactly where each axis is at the same time.

These HCTL 2000 counters have internal buffers, so if there is a strobe signal on one of the inputs to this chip, it actually takes the contents of position that it has accumulated or each for its particular position, and puts it into a buffer, and meanwhile keeps on counting for the position of the machine. This gives the computer time to then read the buffer and get the contents without interrupting the accuracy or the timing of the machine. The actual input to these HCTL 2000 counters is standard off-the-shelf optical encoders 68 and 76. These are called boundary encoders and have two outputs called sine and cosine to signal slightly out of phase, so that not only can one keep track of the number of counts per revolution, but one can also determine which direction the encoder is turning.

These HCTL 2000 chips are designed for this type of encoder, and they are packaged to have a lot of unique hardware to one electronic circuit. A bus interface 114 and 116 is provided between each HCTL and the computer bus 118, so that there is normal arbitration between the one HCTL and another, and other devices that may be on the computer bus. The two encoders are made by BEI, of San Marcos, California. An encoder geared to the input, which takes care of the position of the beam and the encoder, goes through the axis which rotates the two.

Each encoder is geared to the actual shafts of revolution through 8 to 1 gearing, so each encoder has 4,096 counts per revolution, so the total number of counts per axis revolution would be 4,096×8 or over 32,768. Each time there is a beam signal, that is a beam going on or off, each of the respective HCTL 2000 is strobed, the contents of the counter is put into its buffer, and the computer on a regular basis reads the buffer and finds out how far the motion has gone from the last time, and updates the internal position that is held within the computer. Where the beam is going on or going off, it is really set up by the computer to a switching device 120 that is on an electronic circuit board called the strobe control, so the computer can set up whether it wants a recording or a strobing of these counters for the beam going from off condition to an on or from on to off.

The computer reads the status of these buffers on the counters on a regular basis, and this is done by interrupting the computers normal mode of operation by a signal that normally is carried on all computers and called an interrupt signal. An interrupt clock 122, that is also shown in the schematic, generates this signal which runs maybe 200 to 300 times a second. The computer 100 looks at these buffers and finds what the position has been strobed by the beam, and if there has not been a beam event, the computer will then strobe artificially and cause the contents of the counter to be transferred into the buffer and then read. This enables the system to always keep track of where the positions are.

The circuit also has what is called a watchdog timer 124, which is used in case the computer stops or if power cord is pulled or something happens. For example, if the computer has not provided regular updates or fresh data to the D/A's on a regular basis, that is nearly 200 times a second, and there is a lapse of 10 or 15 milliseconds, then the motors are shut off. There is an inhibit control signal that goes to the motor controls, and it turns off the DC going to the motors so that there is no runaway condition.

At the bottom of FIG. 6, schematic is the actual beam control. The beam in this case is an infrared beam caused by passing current through the photo diode. A 100 ohm resistor is placed in series with the photo diode to provide the correct amount of current for that device. The photo diode sends out the infrared beam across the gap that is used to measure the tube, and its strikes a photo transistor 90. The more light that strikes on the surface of the photo transistor, the more it is in a conducting mode.

Because ambient lights, in addition to sunlight, as well as fluorescent and incandescent lamps, have some infrared, they must be compensated for. The need to measure the ambient lights and compensate for its effects on the light sensor is handled by an ambient photo transistor 92 that is receiving light independent or remote from the beam itself for reading background lights. Both the outputs from the two photo transistors 90 and 92 go to a comparator 126, which is a LM 311 analog to digital comparator. The LM 311 is a small electronic chip that has two inputs, pin #2 at 128, and pin #3 at 130, and if pin #3 goes to a higher voltage than pin #2, then the output of the LM 311 on pin #7 at 132 goes from 5 volts to 0 volts, and if pin 3 goes less than pin 2 in voltage, then it goes the opposite way. So if the beam is on, then the photo transistor is conducting, and it is causing the voltage on pin 3 to be lower than than on 2, and the output on pin 7 would be 5 volts. But if there's an interruption in the beam, then the photo transistor stops conducting, and pin 3 raises above the value of pin 2, and the output of the comparator goes from 5 volts to 0 volts.

As can be seen, the ambient photo transistor 92, because it is really in an analog proportioning mode, can raise and lower the voltage on pin 128 somewhat proportionally to the ambient light. The circuit includes resistor 136 of 100 ohms, resistors 138, 140, 142, and 144 of 200 ohms, 146 of one mega ohm and 148 of one kilo ohm. In order to get the right balance for the level of 128 relative to pin 130, there is a need to bring in a little offset from the outside world, a little bit offset voltage to just get everything set up. This is done from the computer by sending out a digital number to DA converter 134, which provides a little bit of voltage to provide the right ratio between the levels that pin 128 and pin 130 see.

The computer 100 determines the amount of voltage required there by doing a little calibration test. It will raise the voltage until the beam will not shut off, or the output of the comparator will not go low when the beam is blocked. The computer will lower the voltage until the output of the comparator goes low, even though the beam is still on or unblocked. This forms the two extremes, then the computer program automatically picks the value half-way between the two extremes to be the bias value.

To summarize, the computer accesses this board at about 250 times per second. It first checks the two HCTL counters 110 and 112 by the beam. If it has or does see a strobe beam, then it knows that the buffers have the data of the position of each arm when the strobe beam occurred. It then reads the buffers and brings the data into the computer for further processing. If there has not been a strobe beam, then it artificially causes a strobe beam, so that the present values of the counters are read into the buffer, and then the computer goes ahead and reads those buffer values. After reading the buffers and calculating the new position for each of the motions, the computer determines the amount of voltage for each motor, and provides this to the D/A converters 106 and 108 for each motor. This is done during each interrupt cycle, which is about 250 times per second.

The beam bias doesn't have to be changed very often. It is anticipated that there would be a calibration check, maybe once each main cycle just before a tube is measured. The computer would go through a quick auto calibration cycle for the beam, and then would measure the tube. At the present time, it is anticipated that it would go through that once every 3 or 4 minutes. There is also an index control 150 and 152 for each encoder when the system starts out from a cold start, it needs to synchronize in the position of each motion to its absolute zero.

The counters 110 and 112 have unique features in that they don't count unless they get a special reset signal, and there is such a signal on each encoder 68 and 76. Once each revolution of a reset signal occurs, it is unique to every revolution on the encoder, so the counters don't count until that signal comes through. When this signal occurs, they start counting so that then there is a kind of lock into the phase of the encoder. If they are locked in phase, the computer can be locked in as well.

The encoders are geared 8 to 1, and a limit switch is used to detect roughly one part in 8 of the main axis of revolution around the total 360 degrees. So once the encoder gets to within close range of where the zero is to be, the switch trips and indicates that position. We then go to the next index position, and the signal occurs, and the counter responds and starts counting, so that the machine is now locked into zero. This is referred to as homing or going to the zero position, sometimes called zeroing. It is this particular cycle of moving each axis separately or individually to its limit switch position, seeing the switch and then advancing further until it causes the index to occur, and that starts the counters running, and it locks the system into operation.

This particular part of the machine is really important in that there is a strobe control that causes both these counters to take the present value, and put it into a buffer, so that the computer can on a regular basis pick up those values and do the processing. Thus, having a buffer lightens the load of the computer, because it doesn't have to respond exactly when the beam event occurs. And, also the computer doesn't have to be super fast getting to the signal, so it helps to take off some of the burden the computer has to do.

Figure 7:
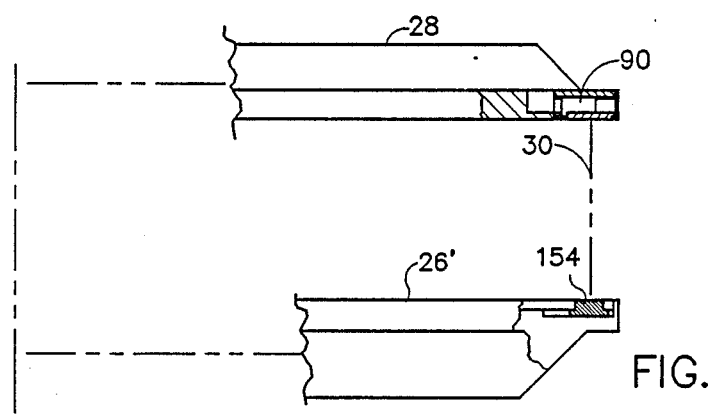
FIG. 7 is a partial side elevation view of an alternate embodiment of the light beam arms.

Referring to FIG. 7, the lower arm 26' can be identical to the upper arm, and simply carry a light emitting diode rather than a laser as illustrated in FIG. 2. This provides a simpler and less expensive machine for smaller operations. The laser would be needed where a large distance is needed between the arms and a LED doesn't provide adequate light.

In operation, starting with a cold start with power on, the first thing that is necessary is for the zeroing or homing of the axis. For convenience, the beam carrier axis is referred to as the "B'" axis, and the part holder axis if referred to as the "A'" axis. There will not be a tube or part in position in the part holder, so that there won't be any interference, and the B' axis, which is the one carrying the beam arm, will be zeroed first. It will rotate counter clockwise, which is a positive direction for the system. This follows the right hand rule in that the machine sees the axis vertical until it a sees the limit switch, at which point it will reverse until the first index position from the encoder, so that's a known position. This index position is so many counts from zero, and that value of how many counts of zero is stored and put into the command position for that axis by the computer that is registered inside the computer. The axis is driven that many counts to zero, at which point all the internal registers of the computer are set to zero, and the beam arm will rest at that position.

When the B' or beam axis arm has rotated out to the limit switch and has reversed and gone to the nearest index, at that point we stop and do a rough calibration of the beam. We start off with very low bias level, and raise the bias level until the output of the converter goes high. As we see the beam, and the pin 130 on the comparator is at a lower value than pin 128, this means the beam is effective. It is working and we use that beam to help determine how to find a zero for A' axis. There is a course calibration of the beam sensing levels before we return the arm back to a zero, and it is used for determining the position of the A' or holder axis.

The next step is to zero the A' axis, the one carrying the tube by causing it to rotate positive until it sees an index, and once that occurs, it locks in. It could be any one of 8 positions, since the encoder has or is geared 8 to 1 to the main axis. So, the correct one must be determined. When the beam arm is at zero, it is very close to the A' axis, and there is the device holder which can block the beam once each revolution. This becomes like a limit switch, so as the A' axis is rotated once each revolution, it would block the beam, and this would indicate which one of the indexes was the correct one. This is fine except that the device holder can be in the forward or returned position, thus causing two places, 180 degrees apart, where it can be interrupted. Fortunately, this ambiguity can be easily eliminated as explained later.

After the A' encoder has found the index, it goes to its nearest 45 degree point, so this means that the A' axis is at zero at 45, 90, 135, etc., and it has one chance in 8 that the first one is going to be right. The computer sequence then checks to see if the beam is off, if the beam is off or blocked by the device holder 16, then the A' axis is in either the 0 or 180 degree position.

After the holder axis has been zeroed, the next step is to return the tool or clamp flip flop motion to the returned or minus 45 degree position and to resolve the 0/180 degree ambiguity. This is done by rotating the A' axis to approximately the 60 degree position, such the brake disc 60 would be in alignment with locking rod 62 as if the A' axis had been correctly zeroed. Then the beam axis is rotated positive to its 90 degree position, so that it provides mechanical engagement of the differential on the tube axis by means of locking rod 62 and brake disc 60. If the A' axis had been zeroed to its correct zero, the locking rod would engage the brake disc 60 properly at its notch 61. This would be detected by limit switch 67, and would automatically signify that the drive holder was in its returned 45 degree position, and that the A' axis was correctly zeroed. If the locking rod does not engage the notch 61 in the brake disc, spring 65 is compressed and limit switch 67 senses this lack of engagement. This indicates that the device holder is in the forward position, and the A' axis was zeroed to the 180 degree position. To correct this, 180 degrees is subtracted from the present A' axis position. The A' axis is then rotated forward 180 degrees to its zero position.

During this 180 degree rotation, the notch in the brake disc passes and is engaged automatically by the spring biased locking rod. This causes the device holder to move to its returned position during the last 120 degrees of the A' axis rotation. Finally, the B' axis is rotated back to its zero position.

Now, with the clamp in the return position, and the beam arm brought back to zero, the beam is actually interrupted by the tube clamps since it is in a return position. The clamp will actually block the beam so that the bias level can be set by moving the beam arm away from zero, and causing the beam to exist again as to be unbroken, and then returning back to zero, and causes it to break. By doing this at the same time, we are adjusting the bias so that we can find a half-way point, where the beam simply turns off the electronics at the point where it is always off, so half-way between will be our set value.

After the beam has been set properly, the zero homing and calibration part, and the machine is ready to go to its first position, its load position. In order to do this, it first brings the clamp to a vertical position mechanically. This leaves the clamp vertically, so the operator can load the tube, and use the clamp in the vertical position to identify how the tube should be orientated, since this is the easiest way for one to view the tube position relative to the machine.

The desired loading orientation and position for the tube is shown on the video screen. There the tube graphically is depicted in the clamp position as one looks down at the machine, with the tube clamp also depicted on the screen. On the monitor, the operator can see the orientation desired for the tube, and places the tube into the clamp following this reference. Once this has been complete, the operator then, through the interactive touch screen system over the monitor, causes the machine to go into automatic cycle.

The first step is for the machine to return the tube clamp to its return position. This is just like going from forward to return, and through this full cycle the clamp will be mechanically returned to its return position. The first step of the automatic sequence is to measure the straight section of tube that is held by the clamp. Any straight section is measured in both the forward and returned position of the tube clamp giving two sets of planar data. Each planar set consists of measurements near each end of the straight section, giving two sets of diametral data. Each set of diametral data consists of two sets of edge data. Each set of edge data consists of two beam positions. One position occurs when the beam is going off and a second position occurs during the reverse motion as the beam comes back on. These two positions are averaged to form one composite beam edge position. Thus, each straight is defined by 16 beam measurements, which are quickly reduced to eight by the averaging.

The automatic sequence obtains two sets of diametral measurements of the straight section held by the clamp, one on each side of the clamp. And, then at the same time, with the clamp in the same position, it goes to an adjacent straight section of tube that is beyond a bend. When the holder is grasping a tube near the middle, there will be a bend on each end of the straight section that is being held. It could use either bend on either side of the straight, but it chooses the bend that has a larger angle and goes beyond that bend to the next straight section and measures it, obtaining a second planar set of beam position data.

At this point, the tube clamp is pivoted to the forward position, and it repeats these two steps, measuring again on both sides of the clamp, and then the second straight on the bend having the larger angle. Now, it has two sets of orthogonal planar data for each of the two tube straights, from which two vectors can be constructed to align within the constraints of the diametral beam positions.

These two vectors form a reference for the entire tube shape, since their cross product and their intersection form a plane and an origin, respectively. With this plane and origin, the computer sequence, through common transformation operations, can obtain any point on the tube in the same reference position of the tube which is also in the same reference of the machine.

This then provides the computer program sequence with the information to go ahead and measure all the points on the tube. Based on a lot of tradition in the market place, what is desired is to measure the accuracy or the position of the tube along the straight sections near each bend, which are called tangent points. The computer sequence will also measure each tube end.

When the computer sequence is working at the ends of the tube, it will have one set of diametral measurements at a tangent point before the first bend and just after the last bend, and then it would also have one set of diametral measurements about one diameter away from the end. The end measurement is a set of edge data, one with the beam going off during the forward measuring path, and one obtained with the beam going on during the reverse path. These two beam positions are averaged. The measuring path is along an axis formed by the direction of the end tube straights.

The preferred overall measuring sequence for the entire tube sequence is to start at one end, obtain the diametral measurements near the end, take diametral measurements at the tangent point near the first bend, back up and get the axial edge measurements of the end. The sequence then would progress to the tangent point after the first bend, pick up the diametral measurements there, then get the second diametral measurement for the second tangent point between the first and second bend. It then would keep moving toward the opposite end of the tube, taking two diametral measurements for each tube straight. When it gets to the opposite end of the tube, it obtains the diametral measurement after the last bend, those near the end, and the edge points taken axially at the second end of the tube. The computer sequence brings the holder (flip flop) back to its return position and repeats the same procedure to obtain a second set of planar measurements for each feature.

The computer sequence takes the second set of beam measurements, and since they are 90 degrees out of position, does a geometrical rotation on these beam measurements to bring them back into the reference of the first set. The system now has all of the beam vectors that are tangent to the tube in the desired vicinities of measurements and in the same orientational reference as the tube. The computer sequence then moves into the same kind of processing as in my prior patent, and looks at the difference between these vectors and the actual vectors (i.e. pre-programmed). The distance between two vectors, which is like an intersection, can be compared to a normal diameter, thus providing the errors. The machine then gives a conventional print out of location and value of these errors.

The system is programmed to measure this tube as compared to its desired configuration and orientation.

The computer sequence is designed to look for the differences between the actual tube and its pre-programmed model. Thus, the machine is primarily used for inspection purposes and not to measure a tube when there are no known characteristics about it.

It is apparent that the system can be programmed so that it will measure a tube with the unknown characteristics of the number of bends, the angles, and the lengths. However, there are many more applications for inspection than for developing data for an unknown shape, the latter of which can be better performed by the machine described in my U.S. Pat. No. 3,944,798.

A typical tube having five bends has six straight sections. On each tube clamp position, there would be six times two diametral measurements, each having four beam positions, plus two times two edge measurements for the tube ends giving 52 beam positions. Thus, this typical tube would have 104 beam position measurements describing the edge geometry of the tube. Additional points can easily be generated to take measurements between the tangent points as in the curved sections of the bends. The computer sequence superimposes the desired shape over the part as it is clamped in the machine and drives the machine to pass over every edge point to be measured.

The actual means of getting from one point to the other is very straight forward, and as shown in FIG. 4 of the drawing. If one uses the law of cosines, one can figure out very easily what angle to rotate the beam axis, and what angle to rotate the tube axis to cause any point to be underneath the beam.

While the description of operation has been with reference to measuring tubing, the same machine can be used for measuring sheet metal products. With sheet metal products, one would not have to use the flip flop, but just keep the part in the horizontal XY plane, and rotate the beam and the part, so that the beam would pass across the edge of a non-obscured detail, such as a through hole, cut out, or part boundary. The computer sequence could drive the beam across the edge of a hole and then continue to cross the opposite side. Three or four other paths at various angles across this same hole could be generated to pick up sufficient points to determine the diameter of the position of the hole.

The part with pre-programmed geometry would be loaded on the A' axis using a vacuum, magnetic, or grasping clamp following the preferred angular orientation shown on the computer monitor. The machine measures the actual part edge positions and causes the pre-programmed coordinates of the part to be rotated, translated and superimposed over the actual part, so that the machine can be driven directly to important features. The sheet metal part may have cut-outs, holes, or irregular boundary edges.

The machine will be calibrated with several sets of straight bars by rotating the clamp plus or minus 180 degrees about its vertical axis and taking measurements on its straight bar, near the clamp and outboard ends. Also, by having the bar positioned at various angles, one can determine the angular accuracy of the beam, how each axis is parallel to each other. Any deviation can be included in the rotation geometry. In fact, all deviations that can cause serious errors to the measurements can be measured and compensated by inclusion into the rotation geometry.

For example, if we say the axis is a Z axis, and it normally would be vertical and then its cosine vector would be 0, 0, 1. Through the auto calibration, the computer sequence will find out if that axis really is vertical, and if it is not, it will know the amount. Instead of being 0, 0, 1, it might be 0.0001, 0.0000, 0.9999. The system can perform the auto calibration and provide the correct set of coefficients internally for each of the error reducing elements.

While I have illustrated and described my invention by means of a specific embodiment, it is to be understood that numerous changes and modifications may be made therein without departing from the spirit and scope of the invention as defined in the appended claims.

I claim:

1. An apparatus for determining the configuration of an article of manufacture comprising in combination:
   means for supporting an article for rotation about a vertical axis;
   means for establishing and positioning an energy beam for intersection by said article upon rotation thereof comprising a shaft mounted for rotation about a vertical axis, a pair of vertically spaced arms extending outward from said shaft, and means for generating and transmitting a light beam from the outer end of one of said arms and means for sensing the light beam at the outer end of the other of said arms; and
   means for generating signals responsive to said intersection for establishing the configuration of said article.

2. An apparatus for determining the configuration of an article of manufacture according to claim 1 wherein:
   said means for generating said light beam comprises a light emitting diode.

3. An apparatus for determining the configuration of an article of manufacture according to claim 1 wherein:
   said means for generating said light beam comprises a laser.

4. An apparatus for determining the configuration of an article of manufacture according to claim 1 wherein:
   said means for supporting said article comprises a vertical shaft, and clamp means of an upper end of said shaft for mounting said article.

5. An apparatus for determining the configuration of an article of manufacture according to claim 4 wherein:
   said clamp means is mounted for rotation about a horizontal axis, and means for rotating said clamp means about said horizontal axis.

6. An apparatus for determining the configuration of an article of manufacture according to claim 5 wherein:
   means responsive to rotation of said light beam to an inoperative position for activating said means for rotating said article about said horizontal axis.

7. An apparatus for determining the configuration of an article of manufacture according to claim 1 wherein:
   said means for supporting said article comprises a vertical shaft, and clamp means on an upper end of said shaft for mounting said article.

8. An apparatus for determining the configuration of an article of manufacture according to claim 7 wherein:
   said clamp means is mounted for rotation about a horizontal axis, and means for rotating said clamp means about said horizontal axis.

9. An apparatus for determining the configuration of an article of manufacture according to claim 8 wherein:
   means responsive to rotation of said light beam to an inoperative position to activate means for rotating said article about said horizontal axis.

10. An inspection apparatus for comparing the configuration of an article to a known standard, comprising in combination:
a support frame;
means for supporting an article for at least 180 degree rotation about a first axis and limited rotation about a second axis;
sensing means including a light beam and means for sensing an interruption in said light beam;
means for selectively positioning said light beam for selected interruption by rotation of said workpiece about said first axis; and
means for establishing a coordinate point of the interruption of said beam by said workpiece and comparing said coordinate to a reference.

11. An inspection apparatus according to claim 10 wherein:
said means for positioning said light beam comprises a shaft mounted for rotation about a vertical axis, a pair of vertically spaced arms extending outward from said shaft, and means for generating and transmitting said light beam from the outer end of one of said arms and means for sensing said light beam at the outer end of the other of said arms.

12. An apparatus for determining the configuration of an article of manufacture according to claim 11 wherein:
said means for supporting said article comprises a vertical shaft, and clamp means of an upper end of said shaft for mounting said article.

13. An apparatus for determining the configuration of an article of manufacture according to claim 12 wherein:
said clamp means is mounted for rotation about a horizontal axis, and means for rotating said clamp means about said horizontal axis.

14. An apparatus for determining the configuration of an article of manufacture according to claim 13 wherein:
means responsive to rotation of said light beam to an inoperative position to activate means for rotating said article about said horizontal axis.

15. An inspection apparatus according to claim 14 wherein:
said means for generating said light beam comprises a light emitting diode.

16. An apparatus for determining the configuration of an article of manufacture according to claim 14 wherein:
said means for generating said light beam comprises a laser.

17. An apparatus for determining the configuration of an article of manufacture according to claim 15 wherein:
said sensing means comprises means for compensating for ambient light.

18. A measuring apparatus comprising in combination:
a base support frame;
a first elongated shaft mounted for rotation about a first vertical axis on said support frame for supporting a workpiece for at least 180 degree rotation about a first axis and limited rotation about a second axis;
a second shaft mounted for rotation about a second vertical axis spaced from and parallel to said first axis, a pair of vertically spaced arms extending outward from said second shaft;
sensing means including means for generating a light beam on an outer end of one of said arms, and means for sensing said light beam at the outer end of the other of said arms; and
means responsive to an interruption in said light beam for establishing a coordinate point of the interruption of said beam by said workpiece and comparing said coordinate to a reference.

19. An apparatus according to claim 18 wherein:
said first vertical shaft comprising clamp means for holding a workpiece, said clamp means is mounted for rotation about a horizontal axis; and
means for rotating said clamp means about said horizontal axis.

20. An apparatus according to claim 19 wherein:
means responsive to rotation of said second shaft to an inoperative position to activate said means for rotating said clamp means about said horizontal axis.

21. An inspection apparatus according to claim 20 wherein:
said means for generating said light beam comprises a light emitting diode.

22. An apparatus for determining the configuration of an article of manufacture according to claim 20 wherein:
said means for generating said light beam comprises a laser.

23. An apparatus for determining the configuration of an article of manufacture according to claim 21 wherein:
said sensing means comprises means for compensating for ambient light.

24. A method of inspecting an article, comprising:
simultaneously moving an article and a sensing beam about spaced apart parallel axes for intersecting said beam with said article along a length thereof, moving said article selectively to at least two positions about an axis orthogonal to its parallel axis, and generating signals collectively defining intersections of said beam and a boundary of said article.

25. A method of measuring the dimensions of an article, comprising:
establishing an energy beam for rotation at a spaced radius about a first axis of rotation;
mounting a workpiece for rotation about a second axis beyond said radius for extension of said workpiece into said energy beam; and
simultaneously moving said beam and said workpiece for intersection at selected positions along said workpiece and generating signals collectively defining intersections of said beam with a boundary of said article.

26. A method according to claim 25 wherein:
said step of establishing an energy beam includes generating a light beam by means of a light emitting diode.

27. A method according to claim 25 wherein:
said step of establishing an energy beam includes generating a light beam by means of a laser.

28. A method according to claim 26 wherein:
said step of generating signals comprises compensating for ambient light.

29. A method according to claim 28 wherein:
said step of mounting said workpiece includes selecting a first elongated shaft mounted for rotation about a vertical axis on support frame for supporting said workpiece for at least 180 degree rotation about said second axis and said shaft having means for supporting said workpiece for limited rotation about an orthogonal axis.

* * * * *